US006639790B2

(12) United States Patent
Tsai et al.

(10) Patent No.: US 6,639,790 B2
(45) Date of Patent: Oct. 28, 2003

(54) POWER SUPPLY MODULE IN A PORTABLE COMPUTER

(75) Inventors: Wen-Sung Tsai, Taipei (TW); Wei-Pin Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 85 days.

(21) Appl. No.: 09/683,730

(22) Filed: Feb. 7, 2002

(65) Prior Publication Data

US 2003/0043534 A1 Mar. 6, 2003

(30) Foreign Application Priority Data

Aug. 28, 2001 (TW) ........................................ 90121105 A (51) Int. Cl.[7] .............................. G06F 1/16; H01M 2/10
(52) U.S. Cl. ..................... 361/683; 361/686; 320/112; 429/100; 429/123; D14/341
(58) Field of Search ................................ 361/683, 679, 361/686; 320/112, 113; 429/97, 100, 96, 123; D13/103–106; D14/341, 342, 315, 345

(56) References Cited

U.S. PATENT DOCUMENTS 5,153,817 A * 10/1992 Hosoi et al. ................ 361/685
5,293,300 A * 3/1994 Leung ......................... 361/683
5,506,749 A * 4/1996 Matsuda ...................... 361/683
5,721,668 A * 2/1998 Barrus et al. ................ 361/683
6,285,159 B1 * 9/2001 Ki et al. ...................... 320/112
6,385,039 B1 * 5/2002 Chiang et al. ............... 361/683
6,479,184 B1 * 11/2002 Shiue .......................... 429/123

* cited by examiner

Primary Examiner—Lisa Lea-Edmonds
(74) Attorney, Agent, or Firm—Winston Hsu (57) ABSTRACT

A portable computer includes a housing having a contacting surface and two clamping surfaces, a processor disposed inside the housing, a first power port, and a detachable power supply module. The power supply module includes a module case having a slot positioned corresponding to the contacting surface of the housing for accommodating a battery, a second power port installed on the slot, two clamping devices installed at two opposite ends of the module case each corresponding to a clamping surface of the housing, and a power supply port positioned corresponding to the first power port and connected to the second power port. When attaching the power supply module onto the housing, each clamping device engages with a corresponding clamping surface, the power supplied by the battery transmits through the second power port, the power supply port and the first power port to the processor.

6 Claims, 14 Drawing Sheets

POWER SUPPLY MODULE IN A PORTABLE COMPUTER

BACKGROUND OF INVENTION

1. Field of the Invention

The invention relates to a portable computer, and more particularly, to a portable computer with a power supply module having detachable and replaceable batteries.

2. Description of the Prior Art

The growth in the use of personal computers (PC) marks the present age. As a consequence of recent technical developments, various types of personal computers, such as desktop and portable types, are being manufactured and sold. The portable computers that are produced are compact and light. A good portable computer is designed while taking into consideration its use in a mobile environment, i.e., its portability and suitability for outdoor use.

Figure 1:
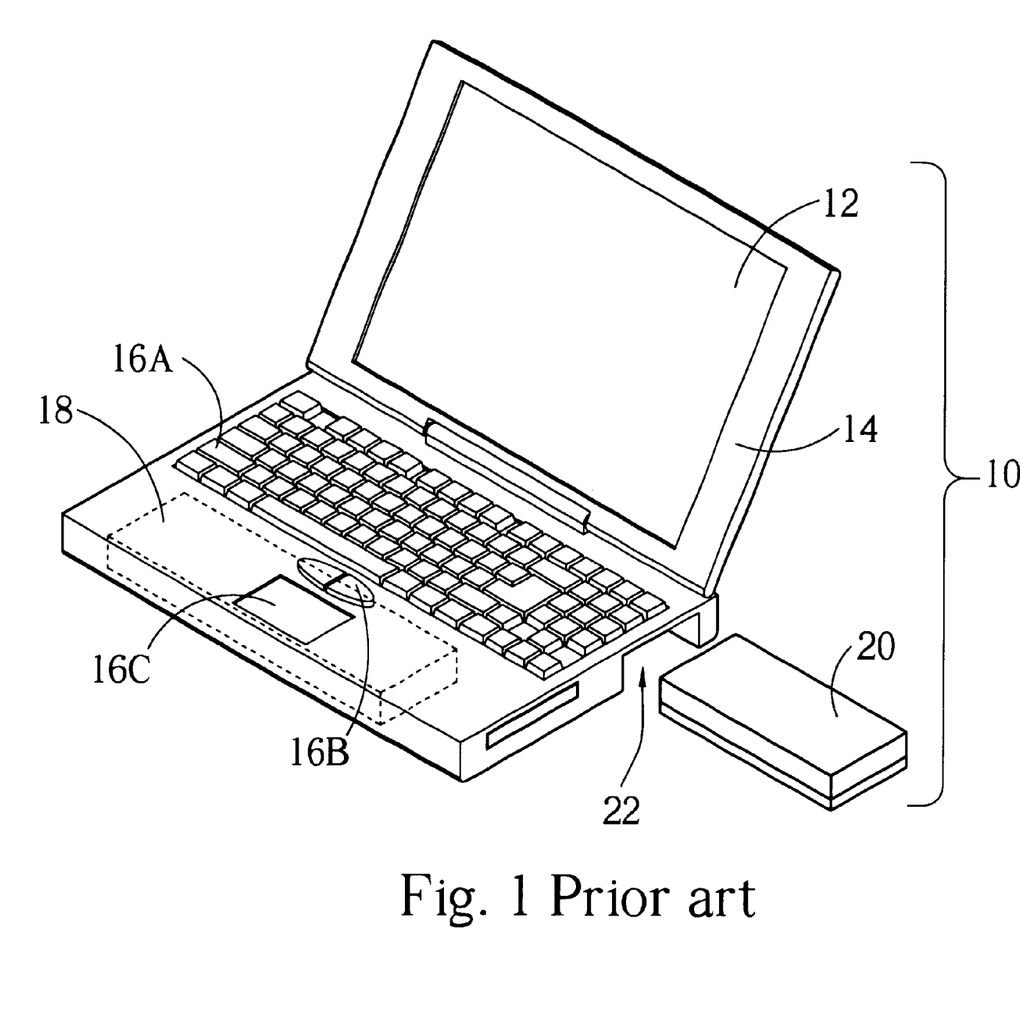
FIG. 1 is a perspective view of a portable computer according to the prior art.

Portable computers are also called laptop computers or notebook computers. Please refer to FIG. 1. FIG. 1 is a perspective view of a portable computer 10 according to the prior art. As shown in FIG. 1, the portable computer 10 has a housing 14, a liquid crystal display panel 12 installed on a surface of the housing 14 for displaying image pictures, an input interface such as a keyboard 16A, a key device 16B and a touch pad 16C for inputting controlling commands and data, and a processor 18 disposed inside the housing 14 for controlling operations of the portable computer 10, such as storing data, executing programs and integrating information.

The purpose of a portable computer is to be able to be carried handily for use anywhere. Therefore, the portable computer 10 of FIG. 1 utilizes a battery 20 to supply power to the processor 18. In the prior art, the battery 20 is a cassette to be inserted into a corresponding slot 22 in the housing 14, forming a monolithic structure with the housing 14 to supply power. When using this conventional portable computer for a long period of time, two batteries 20 or more are required to prolong the operation of the portable computer 10. At first, one battery 20 is inserted into the housing 14 to supply power. Then, when the battery 20 is used up, the battery 20 can be switched to continue to use the portable computer 10.

According to the above-mentioned prior art, there are shortcomings in the conventional portable computer. First, since the battery 20 is inserted into the housing 14 to form a monolithic structure, the battery 20 is required to be covered by a hard case (such as metal or hard plastic) to have enough strength for firmly engaging with the housing 14. When covered with the hard case, the monolithic structure forms a rigid case of the portable computer 10 to bear external stresses such as collisions. Nevertheless, since the strength is obviously weakened when the battery is too lightweight and too thin, the prior art battery with a hard case is incapable of reducing volume and lightening weight. Therefore, when a plurality of spare batteries are carried with a user, the carrying weight is increased and significant space is required. The extra weight and space involved creates great inconvenience and diverges from the original purpose of the portable computer of portability.

SUMMARY OF INVENTION

It is therefore a primary objective of the claimed invention to provide a portable computer with a detachable power supply module to solve the above-mentioned problem.

According to the claimed invention, the portable computer comprises a housing having a contacting surface and two clamping surfaces formed at two opposite ends of the contacting surface. The portable computer further comprises a display panel installed on the housing for displaying image pictures, a processor disposed inside the housing for controlling operations of the portable computer, a first power port installed on the housing for transmitting power to the processor, and a power supply module detachably installed on the housing. The power supply module comprises a module case having a slot positioned corresponding to the contacting surface of the housing for accommodating at least one battery, a second power port installed on the slot for transmitting power supplied by the battery, two clamping devices installed at two opposite ends of the module case each corresponding to a clamping surface of the housing, and a power supply port positioned corresponding to the first power port and connected to the second power port. When attaching the power supply module onto the housing, each clamping device engages with a corresponding clamping surface to attach the power supply module onto the housing. The power supplied by the battery transmits through the second power port, through the power supply port, and then through the first power port to the processor. Moreover, the battery can be removed from the slot and replaced by another battery.

It is an advantage of the claimed invention that the portable computer has a power supply module capable of accommodating batteries and providing enough physical strength for batteries to overcome the prior art shortcomings.

These and other objectives of the present invention will no doubt become obvious to those of ordinary skill in the art after reading the following detailed description of the preferred embodiment that is illustrated in the various figures and drawings.

DETAILED DESCRIPTION

Figure 2A:
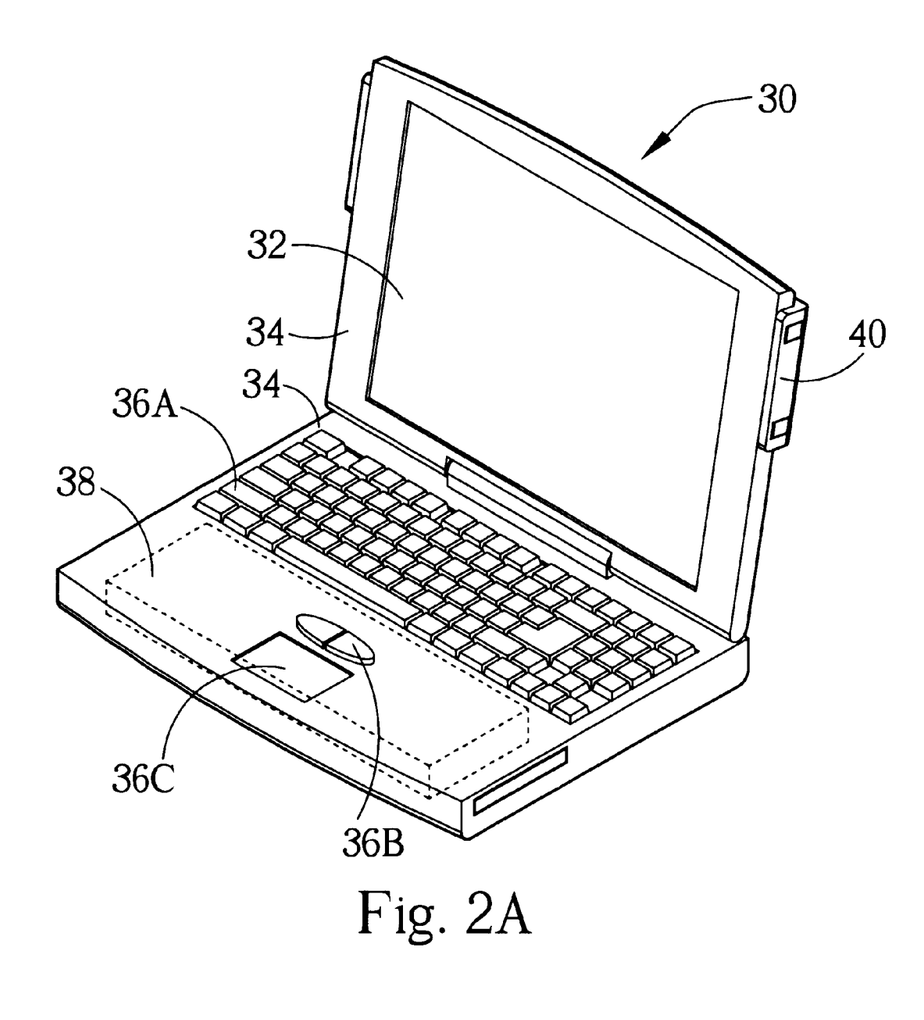
FIG. 2A and FIG. 2B are perspective views of a portable computer according to a first embodiment of the present invention.
Figure 2B:
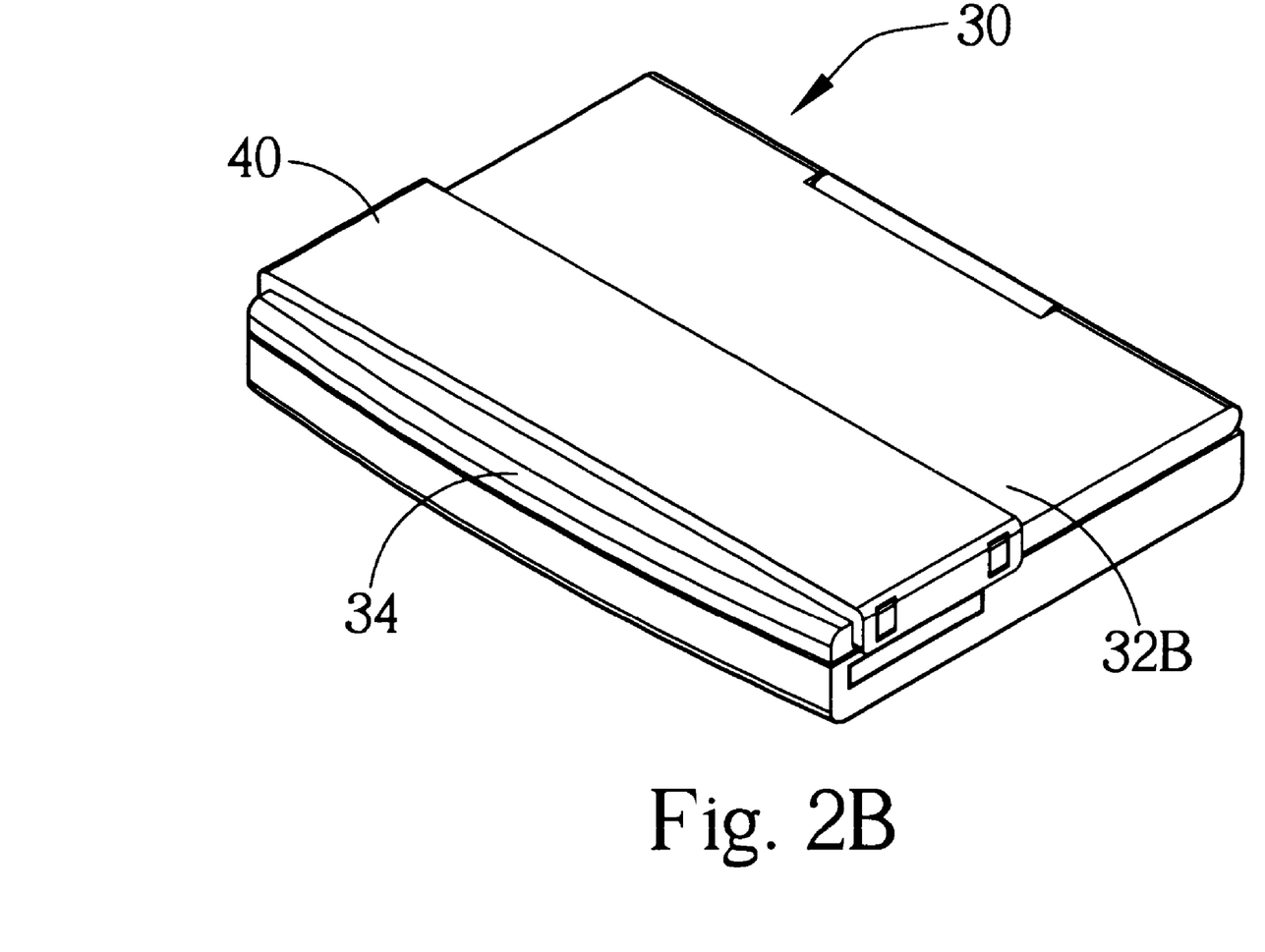

Please refer to FIGS. 2A and 2B. FIG. 2A is a perspective view of a portable computer 30 when the portable computer is unfolded. FIG. 2B is a perspective view of the portable computer 30 when the portable computer is folded. The portable computer 30 comprises a housing 34 having an upper portion and a lower portion, a liquid crystal display panel 32 installed on the upper portion of the housing 34 for displaying image pictures, an input interface such as a keyboard 36A, a key device 36B and a touch pad 36C installed on the lower portion of the housing 34 for inputting data and controlling commands, and a processor 38 disposed inside the housing 34. The processor 38 has a central processing unit, a memory, a hard disc drive, a CD-ROM drive and circuits for the display panel 32 (not shown) for controlling operations of the portable computer 30 to execute programs, process data, and store information.

The portable computer 30 comprises a detachable power supply module 40 installed on the housing 34 to supply power to the processor 38. As shown in FIG. 2B, in this embodiment, the power supply module 40 is installed on a contacting surface 32B opposite the display panel 32 of the housing 34. That is, when the power supply module 40 attaches onto the housing 34, the power supply module 40 is positioned on the back of the display panel 32.

Figure 3A:
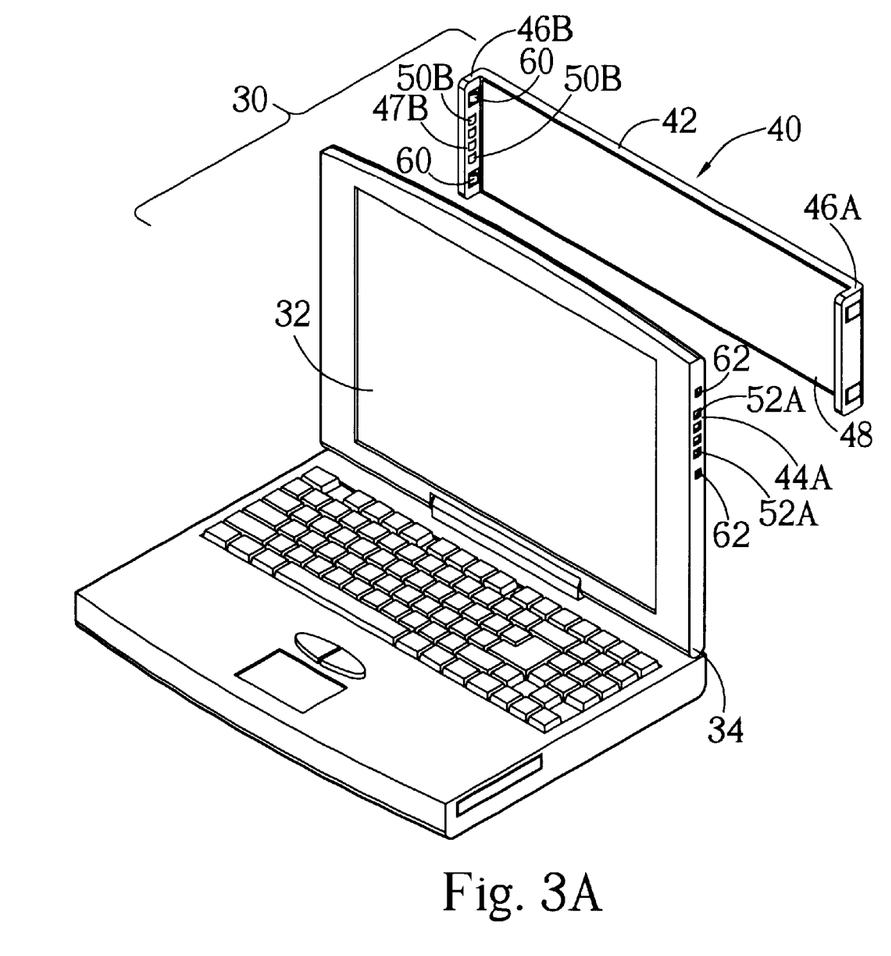
FIG. 3A is a perspective view of a power supply module detached from a housing of the portable computer shown in FIG. 2A.
Figure 3B:
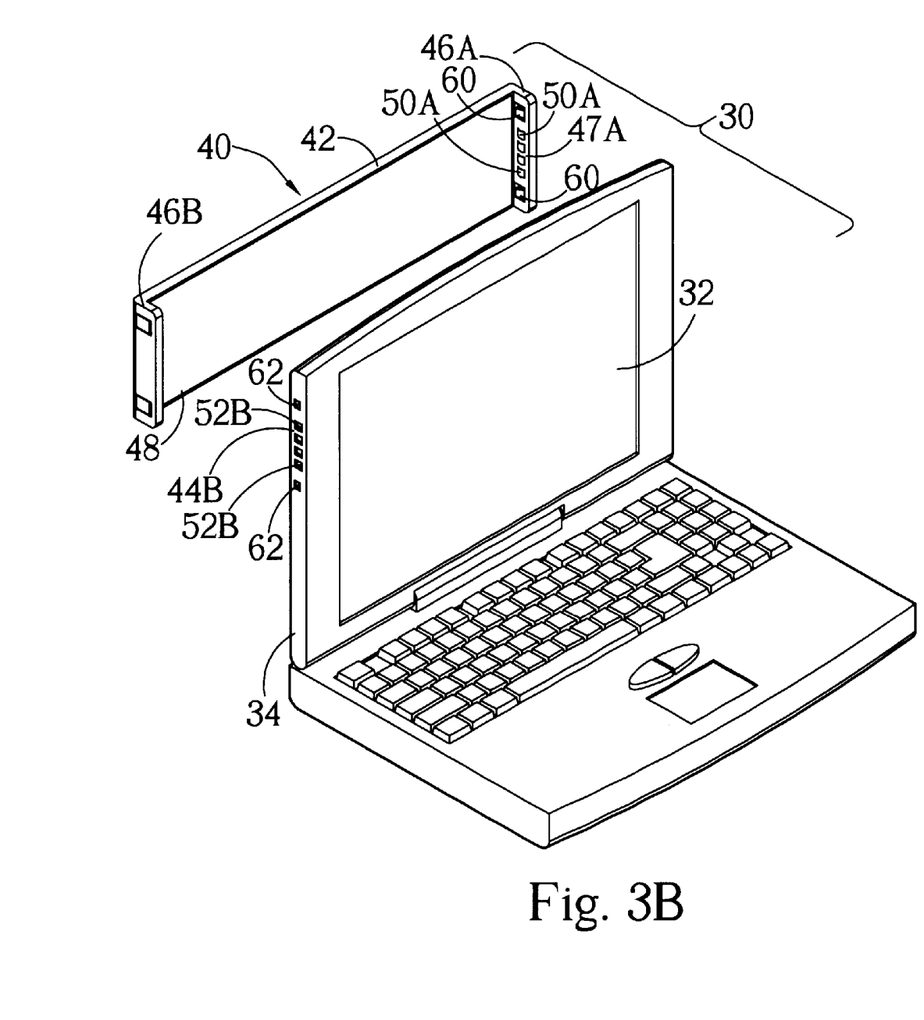
FIG. 3B is an alternative perspective view of the power supply module detached from the housing of the portable computer shown in FIG. 2A from a different angle.

Please refer to FIGS. 3A and 3B. FIGS. 3A and 3B are perspective views of the power supply module 40 detached from the housing 34 of the portable computer 30. The power supply module 40 has a module case 42, and two clamping devices 46A, 46B installed at two opposite ends of the module case 42. The housing 34 further comprises two clamping surfaces 44A, 44B formed at two opposite ends of the housing 34, each corresponding to a clamping device 46A, 46B of the power supply module 40. The clamping devices 46A, 46B further comprise protrusions 60 installed on inner surfaces 47A, 47B of the clamping devices 46A, 46B, and the clamping surfaces 44A, 44B further have insertion holes 62, which match up with the protrusions 60, positioned corresponding to the clamping surfaces 44A, 44B to fix the power supply module 40. When attaching the power supply module 40 onto the housing 34, the inner surfaces 47A, 47B of the clamping devices 46A, 46B engage with the clamping surfaces 44A, 44B of the housing 34, and the protrusions 60 on the inner surfaces 47A, 47B of the clamping devices 46A, 46B insert into the corresponding insertion holes 62 on the clamping surfaces 44A, 44B so as to fix the power supply module 40 on the housing 34.

To supply power to the processor 38 (as shown in FIG. 2A), the power supply module 40 further has power supply ports 50A, 50B positioned on the inner surfaces of the clamping devices 46A, 46B. In this embodiment, the power supply ports 50A, 50B are conductors respectively protruding out the inner surfaces 47A, 47B of the clamping devices. To match up the power supply ports 50A, 50B, the housing 34 comprises corresponding first power ports 52A, 52B installed on the clamping surfaces 44A, 44B and electrically connected to the processor 38. When the power supply module 40 attaches onto the housing 34, the inner surfaces of the clamping devices engage with the corresponding clamping surfaces, and the power supply ports 50A, 50B respectively connect to the corresponding first power ports 52A, 52B to form an electrical connection, thus the power supplied by the power supply module 40 respectively transmits through the power supply ports 50A, 50B to the first power ports 52A, 52B of the housing 34, and finally to the processor 38.

Figure 4A:
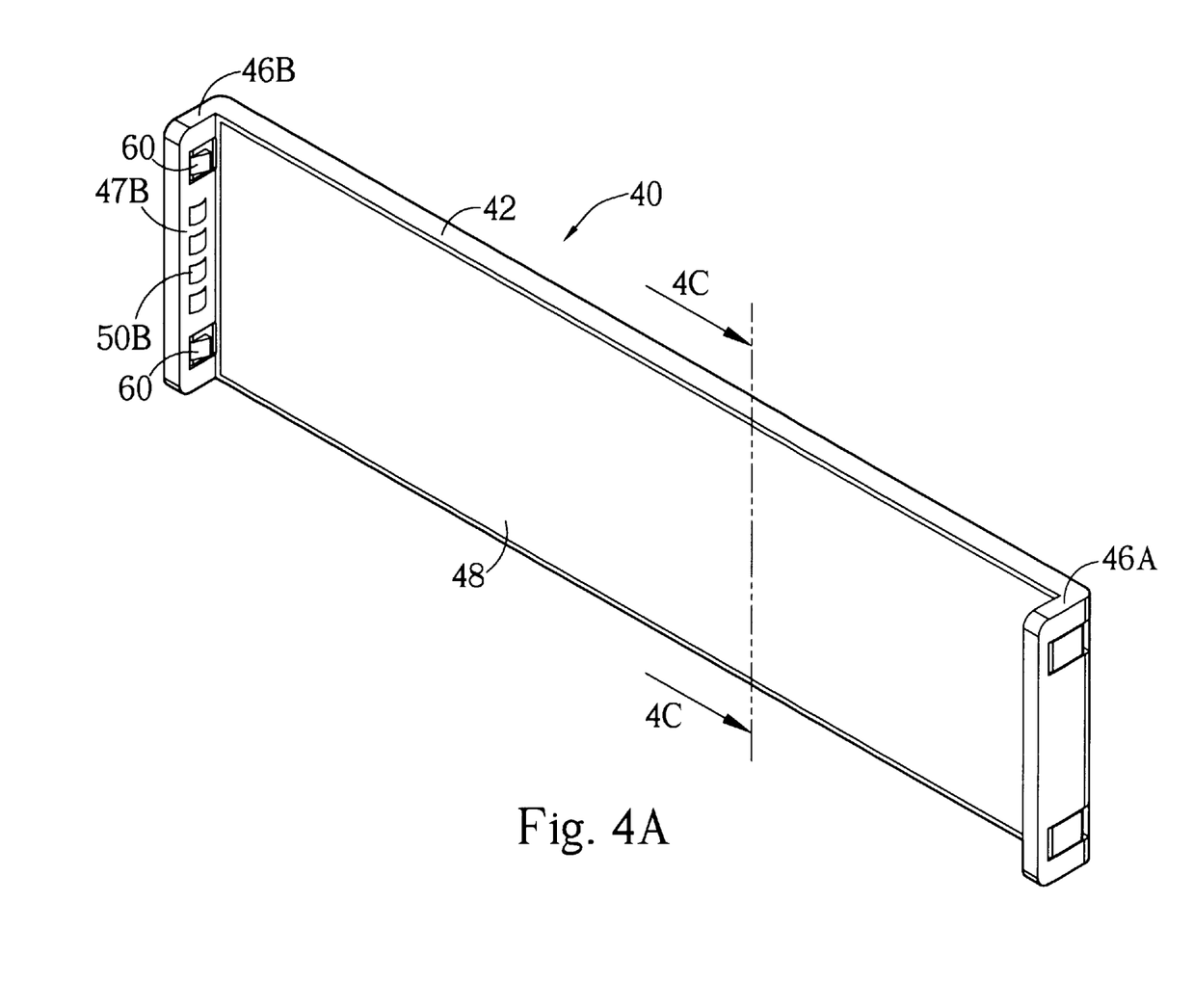
FIG. 4A is a perspective view of the power supply module shown in FIG. 2A.
Figure 4B:
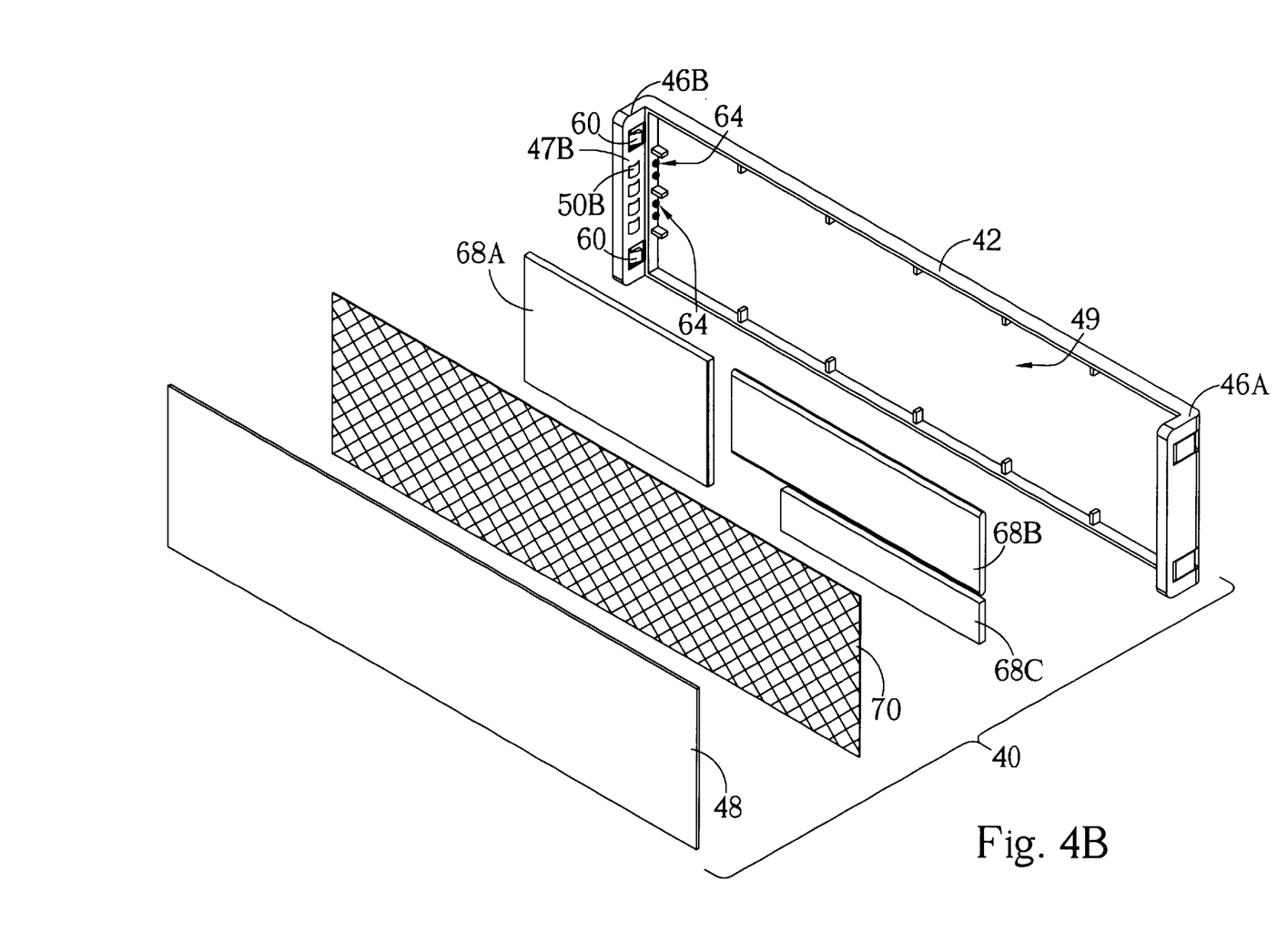
FIG. 4B is an exploded view of the power supply module shown in FIG. 2A.
Figure 4C:
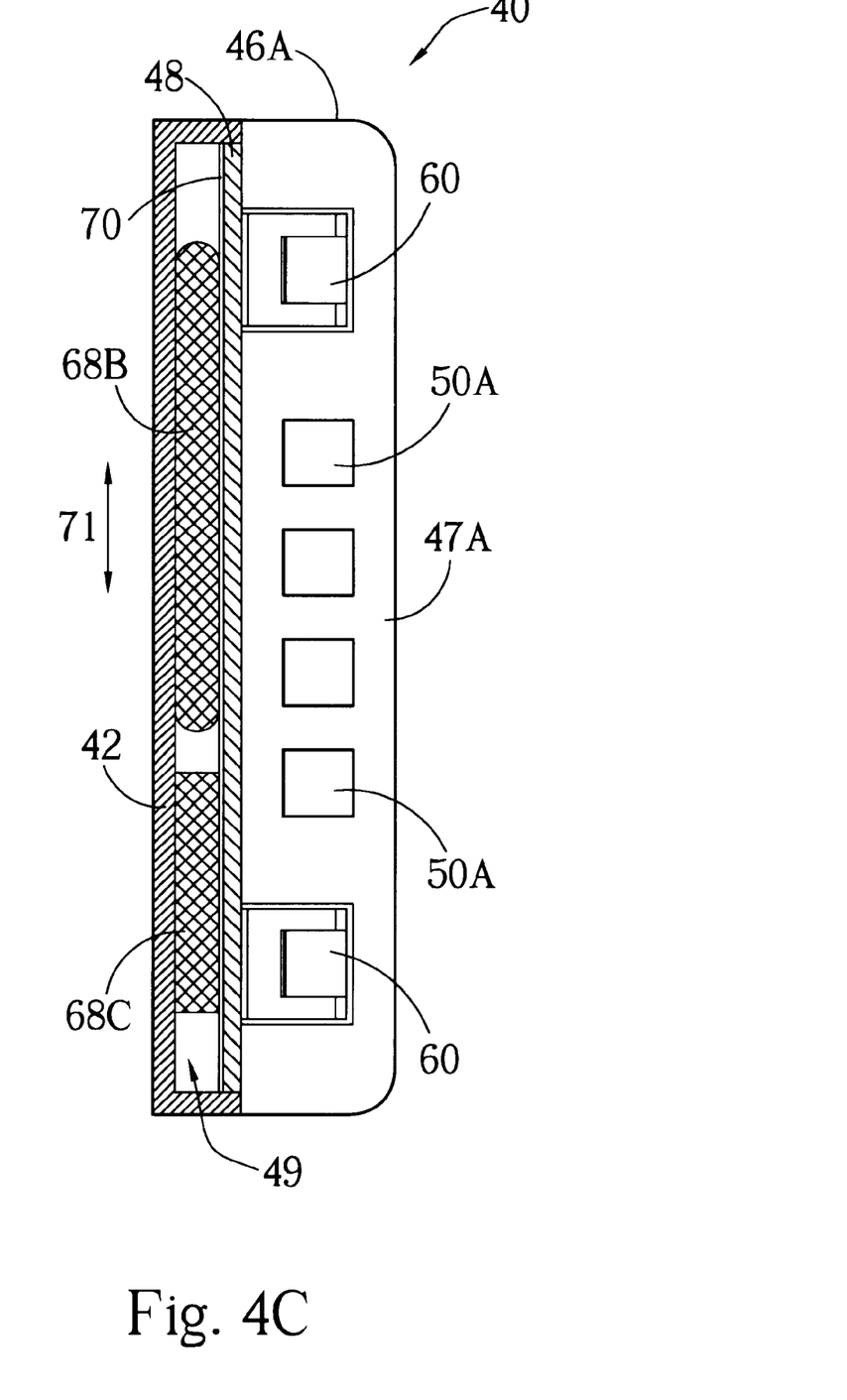
FIG. 4C is a cross-sectional view of the power supply module along line 4C—4C shown in FIG. 4A.

Please refer to FIGS. 4A to 4C. FIGS. 4A and 4B are a perspective view and an exploded view of the power supply module 40 according to the present invention respectively. FIG. 4C is a cross-sectional view along line 4C—4C of the power supply module 40 shown in FIG. 4A. As shown in FIG. 4B, in addition to the clamping devices 46A, 46B, which are monolithic with the module case 42 of the power supply module 40, the module case 42 comprises a slot 49 positioned corresponding to the contacting surface of the housing for accommodating at least one battery, and a cover 48 for covering the slot 49 so as to clamp the battery between the cover 48 and an inner surface of the slot 49. Batteries accommodated in the slot 49 of the power supply module 40 supply power transmitted to the processor. In the preferred embodiment of the present invention, the battery used is a polymer battery, which is soft, lightweight and flexible, and composed of polymer. The polymer battery may be a thin slice or may be bent, curled, or folded. As shown in FIG. 4B, three types of batteries 68A, 68B and 68C are depicted. As long as space in the slot 49 is enough, various types of batteries can be disposed inside the power supply module 40 as a power source. A skid pad 70, which can be made of rubber and with a skid grain thereon, is further disposed between the cover 48 and the battery to prevent sliding of the polymer battery within the slot.

Please refer to FIG. 4C. FIG. 4C is a sectional view of an arrangement of the cover 48, the skid pad 70, the polymer battery (such as the batteries 68B, 68C), and the module case 42. As shown in FIG. 4C, the cover 48 corresponding to the slot 49 in shape matches up the inner surface of the slot 49 to clamp the skid pad 70 and the polymer battery (such as the batteries 68B, 68C) in the slot 49. When attaching the power supply module 40 onto the housing 34 of the portable computer 30, the cover 48 directly engages with the contacting surface 32B of the housing 34 (as shown in FIG. 2B), further, the battery is clamped between the inner surface of the slot 49 and the skid pad 70. The skid pad 70 prevents sliding of the battery in a direction 71 (as shown in FIG. 4C), thus the battery can be attached onto the slot 49 of the power supply module 40 firmly. Naturally, the cover 48 can be attached onto the module case 42 by other fastening apparatus as well, such as a screw hole installed on the cover 48, and a corresponding screw base installed on the module case 42. Hence, the cover 48 is attached onto the module case 42 with a screw, and the batteries and the skid pad 70 are clamped within the slot 49. In the preferred embodiment, the cover 48 is an aluminum panel of lightweight and capable of preventing the batteries from interfering with the electronic operation of the display panel.

Figure 5:
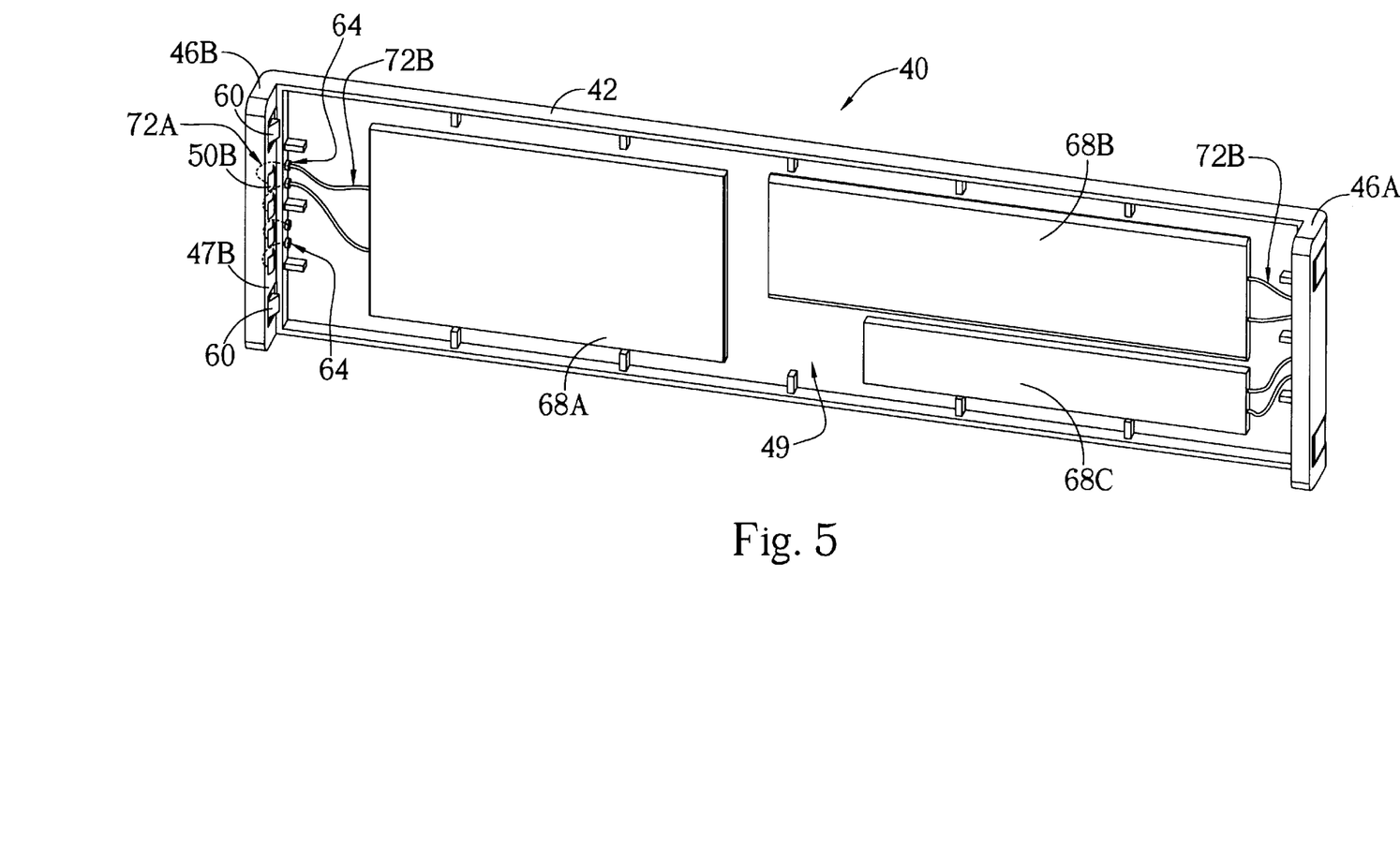
FIG. 5 is a schematic diagram of an electrical connection in the power supply module shown in FIG. 2A.

As mentioned previously, the power transmitted to the processor 38 is actually supplied by the batteries of the power supply module 40 according to the present invention. Please refer to FIG. 5. The cover 48 and the skid pad 70 of the power supply module 40 are not shown for clarity in showing an electrical connection of the power supplied in the power supply module 40. For transmitting the power of the batteries, the power supply module comprises a second power port 64 installed on the slot 49 and electrically connected to the power supply port 50B through an electrical connection 72A inside the power supply module 40. Taking the battery 68A as an example, the electrical connection supplying power in the power supply module 40 is described below. The power supplied by the battery 68A transmits to the second power port 64 through a conducting wire 72B, and then, to the power supply port 50B through the electrical connection 72A in the power supply module 40.

As described in FIGS. 3A and 3B, when attaching the power supply module 40 onto the housing 34 of the portable computer 30, the power supplied by the power supply port 50B transmits to the processor 38 through the first power port 52B. Similarly, the power supply port 50A of the clamping device 46A is electrically connected to the corresponding second power port 64 in the slot 49. The batteries 68B, 68C transmit the power to the second power port 64 through the conducting wire 72B, then to the first power port 52B on the housing 34 through the power supply port 50A on the clamping device 46A. Naturally, while the batteries are short of power, the run-down batteries are removed from the slot 49 and replaced by new ones so that the power supply module 40 continuously supplies sufficient power.

The power supply module 40 of the present invention is capable of detaching or attaching onto the housing 34 of the portable computer 30. As shown in FIGS. 3A and 3B, when attaching the power supply module 40 onto the housing 34, the protrusions 60 on the clamping device 46A and 46B insert into the corresponding insertion holes 62 on the housing 34 to fix the power supply module 40. For conveniently detaching the power supply module 40 of the present invention, the protrusions 60 on the clamping device 46A are specifically designed.

Figure 6A:
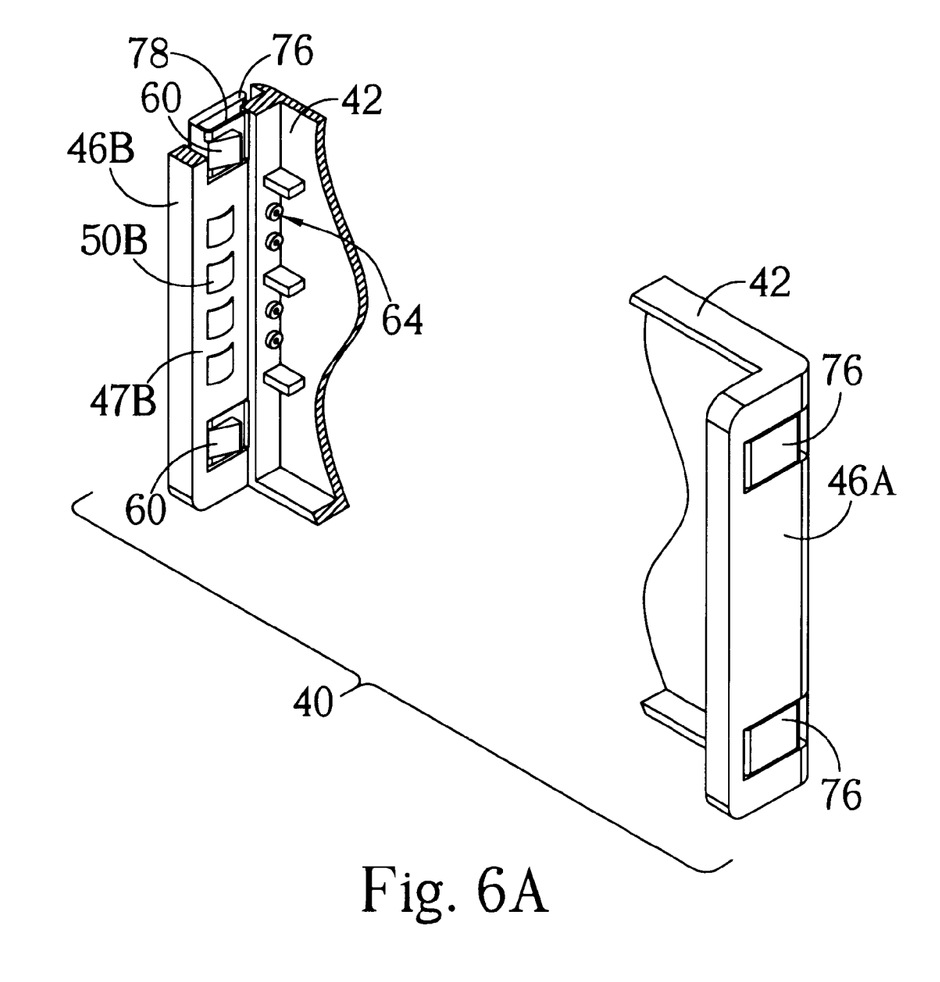
FIG. 6A and FIG. 6B are schematic diagrams of protrusions shown in FIG. 3A in different states.
Figure 6B:
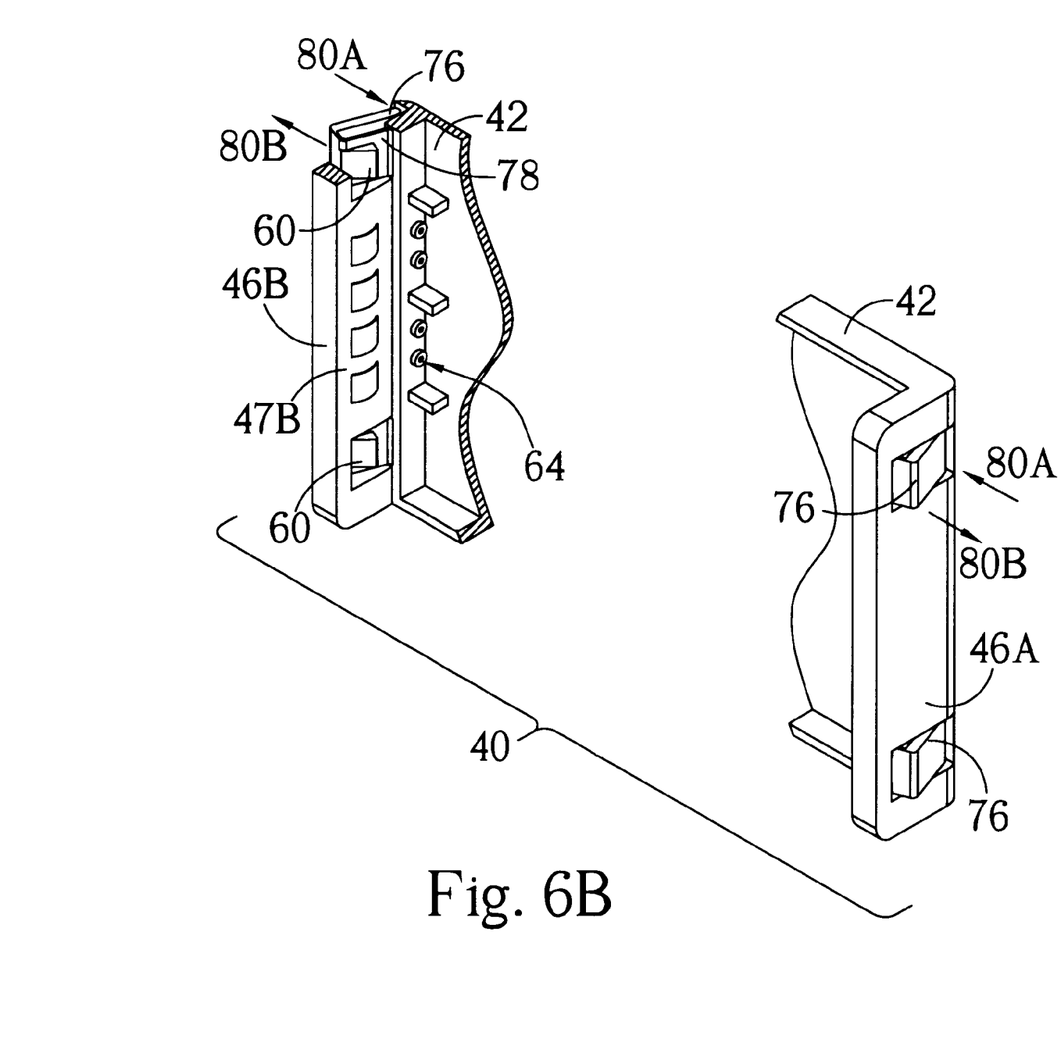

Please refer to FIGS. 6A and 6B. FIGS. 6A and 6B are schematic diagrams of the protrusions 60 of the clamping device in different states (a portion structure of the power supply module 40 is omitted for clarity). In this embodiment, the protrusions 60 are installed on a leaf spring 78 (it may be metal or hard plastic), one end of the leaf spring 78 is fixed onto the module case 42, and the other end is connected to a trigger 76. In a normal state, the protrusions 60 are protruded out the inner surface of the clamping device by the leaf spring 78 as shown in FIG. 6A. This is also the case when attaching the power supply module 40 onto the housing 34. When detaching the power supply module 40 from the housing 34, the trigger 76 is pressed (in a direction shown by an arrow 80A in FIG. 6B) to cause the leaf spring 78 to bend so that the protrusions 60 are moved in a direction 80B to be drawn back to the inner surface of the clamping device. Thus the power supply module 40 is detached from the housing 34 easily.

Figure 7:
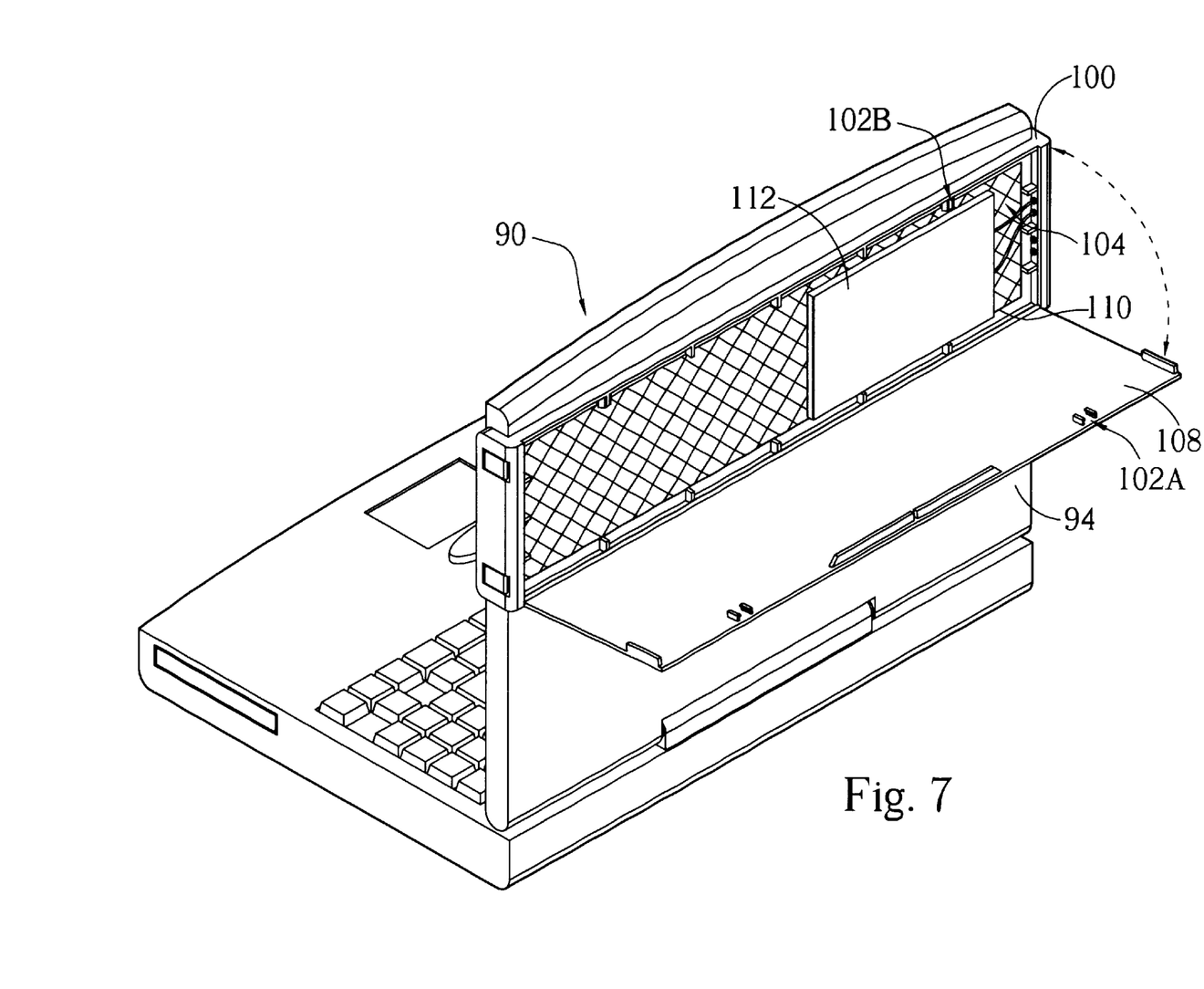
FIG. 7 is a perspective view of a portable computer according to a second embodiment of the present invention.

In addition to the first embodiment, the power supply module of the present invention may be a different design. Please refer to FIG. 7. FIG. 7 is a perspective view of a portable computer 90 with an attached power supply module 100 according to an alternative embodiment of the present invention. The major difference in this embodiment from the above embodiment is the different design of the power supply module 100 of the portable computer 90. Different from the power supply module 40, the power supply module 100 comprises a cover 108 attached onto the power supply module 100 in a liftable way (FIG. 7 shows a perspective view of the cover 108 lifted), and a skid pad 110 disposed within a slot 104 of the power supply module 100. When the cover 108 is covered (along a dotted arrow shown in FIG. 7), a fixed base 102A thereon engages with a fixed hoop 102B so that the cover 108 clamps a polymer battery 112 between the cover 108 and the skid pad 110. A physical structure and an electrical connection of the clamping device in the power supply module 100 are the same as with the power supply module 40, so the details are not described herein.

Figure 8A:
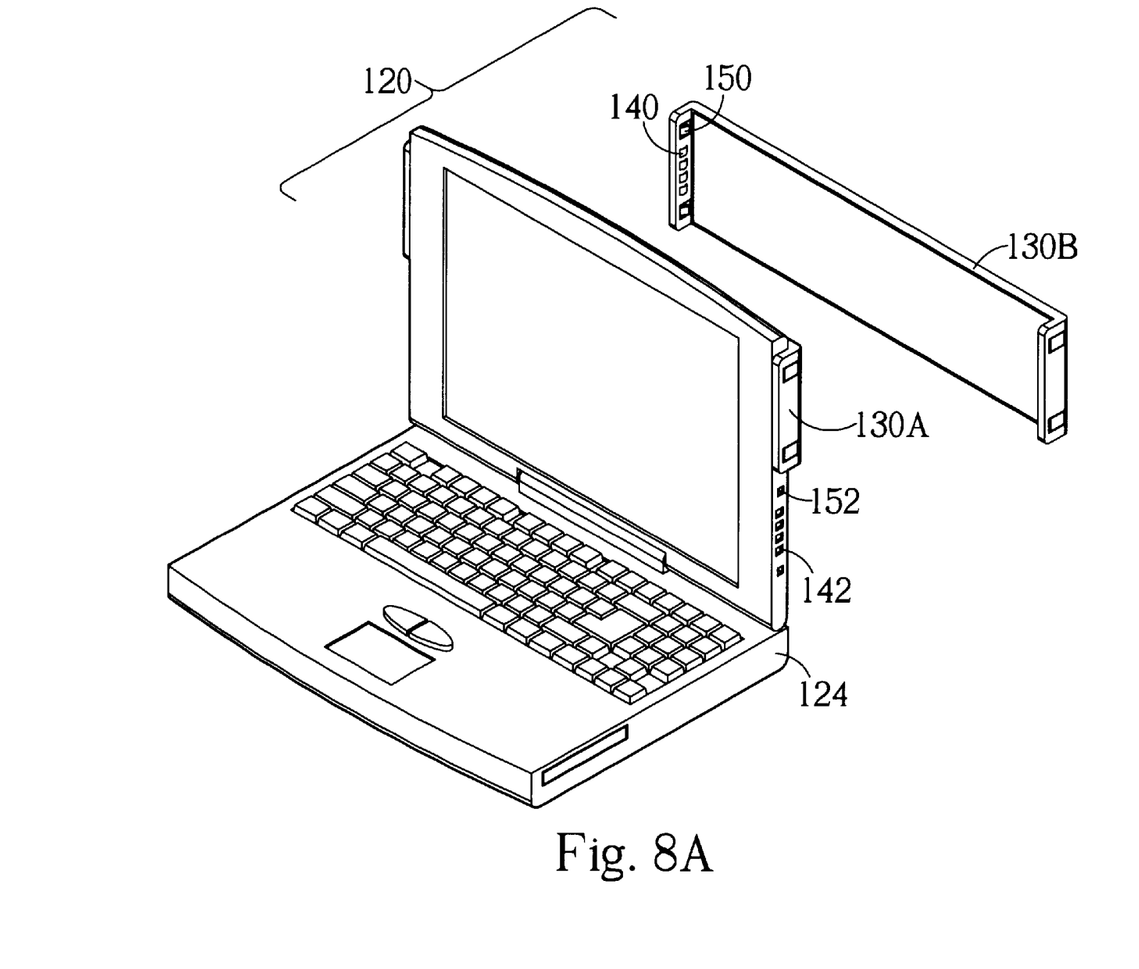
FIG. 8A is a perspective view of a portable computer according to a third embodiment of the present invention.
Figure 8B:
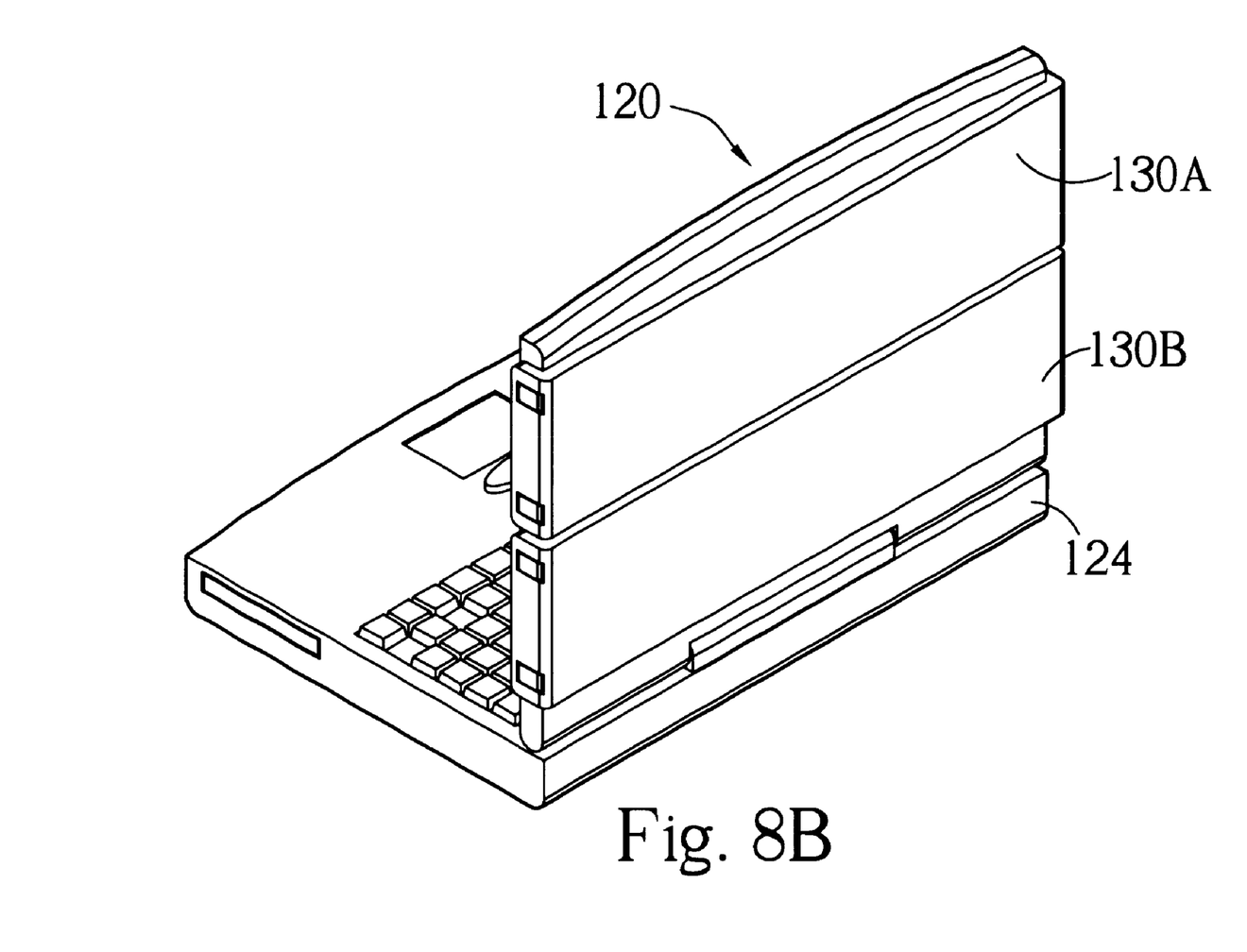
FIG. 8B is an alternative perspective view of the portable computer according to the third embodiment of the present invention from a different angle.

In summary, the portable computer of the present invention equips with a detachable power supply module and the power supply module itself forms a rigid case to accommodate the soft and lightweight polymer batteries. The detachable power supply module of the present invention provides various arrangements. For example, FIGS. 8A and 8B are perspective views of a portable computer 120 according to a yet alternative embodiment of the present invention. The major difference in this embodiment from the above two embodiments is the portable computer 120 capable of attaching two power supply modules 130A and 130B. As shown in FIG. 8A, in addition to the power supply module 130A attached onto the portable computer 120 as well as the above mentioned embodiments, the portable computer 120 comprises another set of insertion holes 152, a first power port 142 installed onto a housing 124 for matching up corresponding protrusions 150, and a power supply port 140 in the another power supply module 130B. FIG. 8B is a perspective view of both of the power supply modules 130A and 130B attached onto the housing 124. Since the power supply modules 130A and 130B are detachable, either one power supply module or both of the power supply modules attached onto the housing 124 is acceptable. Structures of the power supply modules 130A and 130B are the same with the two above embodiments, so the details are not described herein.

As described previously, in the prior art, a portable computer has a cassette battery with a hard case. Since the cassette battery is required to have a certain mechanical strength, the battery is heavy and large. When the operation time of the conventional portable computer is long, a plurality of spare cassette batteries are prepared in advance, thus the carrying weight is heavy and a lot of space is needed, causing great inconvenience. Additionally, the cassette batteries are designed specifically to be inserted into the portable computer firmly. When the design of the portable computer changes, the cassette batteries are forced to be changed as well. The batteries used in the prior art increase difficulties of design and production of the portable computers. This difficulty leads to inconvenience and higher costs for users.

In contrast to the prior art, the power supply module according to the present invention provides a rigid case to accommodate batteries. Therefore the batteries do not require rigid cases, substantially reducing the restrictions on the batteries" mechanical strength. In the preferred embodiment, the present invention utilizes the soft and lightweight polymer battery. When using the portable computer of the present invention for a long time, spare polymer batteries are prepared in advance. When the shortage of power occurs, the run-down polymer batteries are removed from the power supply module and replaced by the spare polymer batteries to continue to the supply of power. Thus, the portable computer according to the present invention is capable of operating for a long amount of time. Furthermore, the polymer battery is lightweight and flexible, permitting the battery to be folded or curled. The flexibility of the batteries reduces the volume and allows the battery to be carried conveniently. Additionally, since the design of the power supply module is capable of accommodating batteries with various sizes and specifications, several types of batteries can be selected. Even if the designs of the portable computers are different, standardized polymer batteries can be used, further reducing the cost of computers. Moreover, the power supply module of the present invention is detachable so that users can flexibly use various power supply modules, depending on their requirements (as disclosed in the third embodiment), to enhance the convenience of use. As described above, the advantages of the present invention enables the portable computer to be used more conveniently and to access data anytime and anywhere, thus enhancing communication and the exchange of information.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A portable computer comprising:
   a housing having a contacting surface and two clamping surfaces formed at two opposite ends of the contacting surface;
   a display panel installed on the housing for displaying image pictures;
   a processor disposed inside the housing for controlling operations of the portable computer;
   a first power port installed on the housing for transmitting power to the processor; and
   a power supply module detachably installed on the housing comprising:
      a module case having a slot positioned corresponding to the contacting surface of the housing for accommodating at least one battery;
      a second power port installed on the slot for transmitting power supplied by the battery;
      two clamping devices installed at two opposite ends of the module case each corresponding to a clamping surface of the housing; and
      a power supply port positioned corresponding to the first power port and connected to the second power port;
   wherein when attaching the power supply module onto the housing, each clamping device engages with a corresponding clamping surface to attach the power supply module onto the housing; the power supplied by the battery transmits through the second power port, the power supply port and the first power port to the processor; and the battery is capable of being removed from the slot and replaced by another battery.

2. The portable computer of claim 1 wherein the battery is a polymer battery.

3. The portable computer of claim 1 wherein the power supply module further comprises a cover for covering the slot so as to clamp the battery between the cover and an inner surface of the slot.

4. The portable computer of claim 3 wherein the power supply module further comprises a skid pad disposed between the cover and the battery to prevent sliding of the battery within the slot.

5. The portable computer of claim 1 wherein the first power port is installed on a clamping surface, and the power supply port is installed on a corresponding clamping device of the power supply module.

6. The portable computer of claim 1 wherein the display panel is a liquid crystal display (LCD) panel installed on a surface of the housing corresponding to the contacting surface.

* * * * *